(12) United States Patent (10) Patent No.: US 11,612,954 B2
Regaard (45) Date of Patent: Mar. 28, 2023

(54) LASER-BEAM MATERIAL MACHINING

(71) Applicant: TRUMPF Werkzeugmaschinen GmbH + Co. KG, Ditzingen (DE)

(72) Inventor: Boris Regaard, Stuttgart (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 504 days.

(21) Appl. No.: 16/747,939

(22) Filed: Jan. 21, 2020

(65) Prior Publication Data

US 2020/0156184 A1 May 21, 2020

Related U.S. Application Data

(63) Continuation of application No. PCT/EP2018/070495, filed on Jul. 27, 2018.

(30) Foreign Application Priority Data

Aug. 3, 2017 (DE) .......................... 102017213511.5

(51) Int. Cl.
*B23K 26/04* (2014.01)
*B23K 26/03* (2006.01)
(Continued)

(52) U.S. Cl.
CPC .......... *B23K 26/043* (2013.01); *B23K 26/032* (2013.01); *B23K 26/36* (2013.01);
(Continued)

(58) Field of Classification Search
CPC .............. B23K 26/0643; B23K 26/032; B23K 26/705; B23K 26/36; B23K 26/04; B23K 26/042; G05B 2219/45041
See application file for complete search history.

(56) References Cited

U.S. PATENT DOCUMENTS 5,166,505 A 11/1992 Gorriz et al.
7,528,344 B2 * 5/2009 Horn ...................... B23K 26/04
219/121.84
(Continued)

FOREIGN PATENT DOCUMENTS

CN 101990478 3/2011
CN 103476537 12/2013
(Continued)

OTHER PUBLICATIONS

Machine translation of DE 102009042529A1, Jul. 2022 (Year: 2022).*
(Continued)

*Primary Examiner* — Geoffrey S Evans
(74) *Attorney, Agent, or Firm* — Fish & Richardson P.C.

(57) ABSTRACT

A method performed by a laser machine includes: before a laser-beam machining process, recording an influence of a change in a position of at least one movable laser machine component on a lateral position of a focal point of a laser beam in a focal plane or relative to a reference point, storing an association between the position of the movable laser machine component and the lateral position, and then, setting, based on the stored association, the focal point to a preset lateral position in the focal plane or relative to the reference point by setting the position of the movable laser machine component. The movable laser machine component can include at least one of at least one optical element in a beam path of the laser beam, a laser-beam machining head in a work area of a laser machine, or a movable part of the laser-beam machining head.

17 Claims, 3 Drawing Sheets

(51) Int. Cl.
  *B23K 26/70* (2014.01)
  *B23K 26/36* (2014.01)
  *G05B 19/18* (2006.01)

(52) U.S. Cl.
  CPC .......... *B23K 26/705* (2015.10); *G05B 19/182* (2013.01); *G05B 2219/45041* (2013.01)

(56) References Cited

U.S. PATENT DOCUMENTS

| | | | | |
|---|---|---|---|---|
| 9,511,450 | B2* | 12/2016 | Weick | B23K 26/0869 |
| 2003/0002055 | A1* | 1/2003 | Kilthau | B23K 26/04 356/614 |
| 2009/0010631 | A1 | 1/2009 | Weick et al. | |
| 2011/0042360 | A1 | 2/2011 | Takahashi et al. | |
| 2013/0319980 | A1* | 12/2013 | Hesse | B23K 26/032 219/121.62 |
| 2014/0042133 | A1 | 2/2014 | Weick | |
| 2015/0260985 | A1* | 9/2015 | Kitamura | G02B 5/3083 359/206.1 |
| 2016/0114434 | A1* | 4/2016 | Regaard | B23K 26/707 219/121.81 |
| 2020/0398373 | A1* | 12/2020 | Rataj | B23K 26/0643 |

FOREIGN PATENT DOCUMENTS

| | | | | |
|---|---|---|---|---|
| DE | 102007029787 | B3 | | 9/2008 |
| DE | 102007013623 | A1 | | 10/2008 |
| DE | 102007048471 | A1 | | 4/2009 |
| DE | 102009042529 | A1 * | 5/2011 | ........... B23K 26/702 |
| DE | 102011003717 | A1 | | 8/2012 |
| DE | 102011007176 | A1 | | 10/2012 |
| EP | 0453733 | | | 10/1991 |
| EP | 0680805 | A2 | | 11/1995 |
| EP | 1728581 | A1 | | 12/2006 |
| EP | 2687317 | A1 | | 1/2014 |
| EP | 2894004 | A1 | | 7/2015 |
| EP | WO 2019/025328 | A1 | | 2/2019 |
| JP | 201386173 | A | | 5/2013 |
| JP | 2015013297 | | | 1/2015 |
| JP | 2016524539 | | | 8/2016 |
| JP | 2017077577 | | | 4/2017 |

OTHER PUBLICATIONS

PCT International Preliminary Report on Patentability in International Appln. No. PCT/EP2018/070495, dated Feb. 4, 2020, 15 pages (with English translation).
PCT International Search Report and Written Opinion in International Appln. No. PCT/EP2018/070495, dated Nov. 22, 2018, 21 pages (with English translation).
CN Office Action in Chinese Appln. No. 201880050103.5, dated Mar. 31, 2021, 28 pages (with English translation).
CN Office Action in Chinese Appln. No. 201880050103.5, dated Nov. 16, 2021, 22 pages (with English translation).
JP Japanese Office Action in Japanese Appln. No. 2020-505269, dated Mar. 29, 2022, 10 pages.
DE Office Action in German Appln. No. 102017213511.5, dated Nov. 17, 2022, 15 pages (with English translation).
JP Japanese Office Action in Japanese Appln. No. 2020505269, dated Nov. 16, 2022, 10 pages (with English translation).

* cited by examiner

LASER-BEAM MATERIAL MACHINING

CROSS REFERENCE TO RELATED APPLICATIONS

This application is a continuation of and claims priority under 35 U.S.C. § 120 from PCT Application No. PCT/EP2018/070495, filed on Jul. 27, 2018, which claims priority from German Application No. 10 2017 213 511.5, filed on Aug. 3, 2017. The entire contents of each of these priority applications are incorporated herein by reference.

TECHNICAL FIELD

The invention relates to a method for laser-beam material machining and to a laser machine.

BACKGROUND

Modern-day laser-beam machining heads on machines for laser-beam material machining, in particular laser-beam cutting heads, have a very precise design in order to sufficiently minimize lateral positional errors of the laser-beam focal point on the workpiece to be machined. Typical positional tolerances of the laser-beam focal point in the laser-beam nozzle are 50 µm. This leads to an admissible positional error of the beamforming lenses in the laser-beam machining head of less than 5 µm. The high precision requires correspondingly high costs to manufacture the laser-beam machining heads, in particular for laser-beam machining heads having a zoom function, e.g., having the option of moving the lens(es) arranged in the head in the beam propagation direction. In such zoom optics, a rotationally symmetrical, low-stretch design is required, for example. In addition, these laser-beam machining heads must be designed such that the mechanical errors that occur can be compensated for. The position of the optical elements in the laser-beam machining head and/or the position of the fiber end of an optical fiber guided to the machining head therefore have to comprise a degree of freedom that allows the optical elements or the fiber end to shift and/or tilt perpendicularly to the beam direction, such that a precise (manual) lateral adjustment of the laser-beam focal point in the focal plane relative to the fixed reference points (for example of a cutting nozzle) can be made when putting the laser-beam machining head into operation.

During operation, the optical elements (lenses, mirrors, mechanical receptacles) in the machining head heat up as a result of the large laser power introduced, and can thermally deform as a result of alternately heating and cooling. These deformations happen slowly (duration of more than one second) and likewise lead to a lateral positional error of the laser-beam focal point on the workpiece. In the event of long beam guide for the laser beam in the machine, as is standard in CO2 laser-beam cutting machines, a change in the temperature in the machine hall or solar radiation on the machine can also lead to changes in the beam position. Furthermore, (reproducible) tilting or shifting of components of the movement system can cause lateral positional errors of the laser-beam focal point to arise in different machining positions in the machine. Similarly, in an optics having a movable Z position of the lenses for adapting the focal position and/or beam diameter, manufacturing tolerances can cause the lateral position of the lenses to vary in different Z positions. This likewise leads to a reproducible lateral positional error of the laser-beam focal point on the workpiece.

The lateral position of the laser-beam nozzle relative to the focusing lens, perpendicular to the beam propagation direction, likewise comprises a degree of tolerance due to manufacturing tolerances of the nozzle. Variations in the nozzle geometry causes an offset of the position of the laser-beam focal point from the center of the nozzle, despite the position of the laser beam remaining the same.

The scenarios described in the previous paragraphs differ to the extent that mechanical positional errors caused by the design or manufacture of the optical elements in the machining head lead to a reproducible beam positional error when each of the lens and mirror positions are the same, while beam positional errors caused by thermal effects or by replacing the cutting nozzle are not reproducible.

In order to compensate for beam positional errors, it is known from DE 10 2007 013 623 A1 or EP 2 894 004 A1, for example, to center the laser beam by changing the inclination of a mirror arranged in the machining head or by shifting the focusing lens perpendicularly to the beam propagation direction in the cutting nozzle.

It is known from DE 10 2011 003 717 A1 to record the circular inner contour of the nozzle by means of an image-recording unit, and to record the nozzle center as the center of the circle of said contour. By means of an adjusting device, the position of the laser beam relative to the nozzle is corrected such that the tool center corresponds to the nozzle center.

SUMMARY

The object of the present invention is to further improve the correction of the beam position in laser-beam machining heads.

According to the invention, this object is achieved by a method performed by a laser machine, in which, before the actual laser-beam machining process, the influence of a change in the position of at least one movable laser machine component, for example, at least one optical element in a beam guide (for example in a laser-beam machining head), and/or of a laser-beam machining head in a work area of the laser machine and/or of a moveable part of the laser-beam machining head, on the position of the focal point of the laser beam in the focal plane or relative to a reference point on the laser-beam machining head, in particular to a nozzle center, is recorded and then, before and/or during laser-beam material machining, the focal point is set on the basis of the previously recorded change in position to a preset position in the focal plane or relative to the reference point by setting the position of at least one optical element in the beam guide of the laser beam, in particular in the laser-beam machining head. In this case, the at least one optical element, which is adjusted before and/or during laser-beam material machining in a controlled manner, can be one of the elements whose change in position causes a change in the lateral position of the focal point. Said at least one optical element is then moved or tilted before and/or during laser-beam material machining in a different spatial direction to that when recording the change in the position of the focal point, which led to the change in position of the focal point. However, an additional optical element in the beam guide of the laser beam is preferably adjusted in order to compensate for the change in the position of the focal point. In this case, which change in the position of the focal point is caused by moving this optical element can be known. Alternatively or in addition, the effect of moving this optical element when putting the laser machine into operation or before the laser-beam machining process is begun can be measured.

In this case, it is conceivable for the influence of a change in the position of a plurality of optical elements on the position of the focal point in the focal plane to be recorded, however only some of the optical elements are adjusted in order to thereby adjust the preset lateral position of the focal point in the focal plane. It should be mentioned that the laser-beam machining head and the optical elements arranged therein are part of the beam guide.

The method according to the invention makes it possible to design the beam guide of a laser machine and/or the laser-beam machining head without the requirement for a high degree of absolute accuracy and to only have a sufficient degree of repetition accuracy with regard to positioning the optical elements or the laser-beam machining head. If, for example, the lenses of a zoom optics are moved on axes that are not exactly parallel, a reproducible lateral position of the laser-beam focus in the focal plane is provided for each adjusted lens position. This measured position is stored together with the adjusted lens position, for example in the control device of the laser machine. In this way, correction values for a desired position of the focal point, which is central with respect to the laser-beam nozzle, for example, can be determined and stored in the control device of the laser machine. Non-measured intermediate values can be suitably interpolated. In a free-beam guidance of the laser beam in the laser machine, a change in the position of the focal point also occurs for different work area positions of the laser-beam machining head and can similarly be determined and stored. Inaccuracies in the manufacture of the machine or the laser-beam machining head can be compensated for by means of the method according to the invention by the correction values determined for the lateral focal position in the focal plane being used during the machining process to adjust the desired lateral focal position for each position adjusted for the machining head and/or optical elements in the beam guide in a controlled manner. In this case, the positional errors are compensated for by shifting and/or tilting at least one optical element in the beam guide of the machine, in particular in the laser-beam machining head. In this way, degrees of freedom for manually adjusting the lens and fiber positions perpendicularly to the beam propagation direction can (but do not have to) be dispensed with. By means of the method according to the invention, mechanical tolerances in the laser-beam machining head and/or in the beam guide can be compensated for quickly and right at the start or before the machining process, e.g., right before an online measurement system can intervene in a regulating manner in the laser-beam machining process. This is significant in that initial incorrect positions of the lateral position of the laser-beam focal point can lead to damage to the tool and/or the workpiece.

At least one parameter, for example the position of a lens of the machining head in the beam propagation direction, that leads to the position of the focal point being changed can be recorded and an assignment of the at least one parameter to a position of the focal point in the focal plane or relative to the reference point can be stored. In particular, a plurality of parameters, such as the Z position of a plurality of beamforming lenses or the X, Y, Z position of the machining head in the machining area, can be recorded and an assignment can be stored for a plurality of parameters. The assignment can be stored in the form of a table or a correction function, for example.

The at least one optical element in the beam guide, which is used to correct the lateral position of the laser-beam focus, can be moved by means of an actuator. According to the invention, an actuable motor-driven correction axis can therefore be provided. By means of a lens that can be moved laterally (perpendicularly to the beam propagation direction) by a motor or a mirror in the laser-beam machining head that can be tipped by a motor, for example, the error in the position of the laser beam can be compensated for on the basis of the stored correction values or the correction function, or a preset position of the focal point can be set.

When putting the laser machine into operation, the correlation between the position of the laser-beam machining head or the optical elements in the laser-beam machining head and the lateral position of the laser-beam focus in the focal plane or with respect to the reference point and the correction values can be determined by means of a basic adjustment or after a specified operating time of a laser-beam machining head using a suitable measurement apparatus, for example by means of a beam of reduced power and a camera arranged in a machining plane (focal plane), or by means of a focus sensor, as described in DE 10 2011 007 176 A1, for example.

Furthermore, the focal point can be positioned centrally or deliberately eccentrically in a laser-beam nozzle of the laser-beam machining head. In particular, the preset position can correspond to the center of a laser-beam nozzle of the laser-beam machining head or can be deliberately offset with respect to the center of the laser-beam nozzle.

In addition, during a laser-beam machining process, the lateral position of the laser-beam focal point, in particular with respect to the laser-beam nozzle, can be recorded and the laser-beam focal point can be adjusted to the preset position, in particular to a central position in the laser-beam nozzle. When carrying out this method step, it is advantageous for the same optical element(s) to be moved by means of an actuator in the beam guide, in particular in the laser-beam machining head, which elements are also used for controlled position correction. This simplifies the adjustment. According to the invention, a controlled beam position setting and beam position correction can be combined with an adjustment method on the basis of previously stored correction values. In addition to controlled compensation, errors in the lateral position of the laser-beam focal point, which arise as a result of thermal effects, for example, are measured during the laser-beam machining process by a suitable measurement system (in each case, if required), for example by a focal position sensor arranged on the laser-beam machining head or by a camera arranged on the machining head. Suitable measurement systems are described in DE 10 2011 007 176 A1 or DE 10 2011 003 717 A1, for example. The measured values thus obtained can be used in a closed-loop control system to correct the position of the focal point by means of the correction axis. An adjusted movement, in particular of the same optical elements, can therefore be superposed on the controlled movement.

After the laser-beam nozzle has been replaced, the center of the laser-beam nozzle can be determined and set as the new target value, e.g., as the preset position, for the controlled lateral positioning and, if necessary, for the adjustment of the lateral position of the laser-beam focal point by means of the above-mentioned measurement systems, in particular by means of a camera arranged on the laser-beam machining head. During the machining process, the position of the laser-beam focal point on the nozzle center can subsequently be controlled or regulated, if necessary. In particular, before and/or during the laser-beam machining process, the position and/or shape of the laser-beam nozzle can be recorded, and the center of the laser-beam nozzle can be specified as the preset position.

According to the invention, a cascade regulation can be realized, in which changes in the lateral position the laser-beam focal point caused by thermal effects can be recorded and corrected via a measurement system in an inner closed-loop control system by means of a focus sensor, and the reference variable for this closed-loop control system can be specified by an external controller, which determines the position of the laser-beam nozzle and specifies this as the setpoint value for the inner closed-loop control system after the nozzle has been replaced.

The scope of the invention also includes a laser machine having a laser-beam machining head and a laser-beam nozzle and a first measurement device for recording the position of a focal point in the focal plane or relative to a reference point on the laser-beam machining head, and a store for storing the assignment of the position of at least one movable optical element in the beam guide of the laser beam, in particular in the laser-beam machining head, and/or the position of the laser-beam machining head in the work area of the laser machine and/or the position of a movable part of the laser-beam machining head to a position of the focal point in the focal plane or relative to a reference point on the laser-beam machining head, and a setting means, which can be controlled by means of a control device, for setting the position of at least one movable optical element in the beam path of the laser beam. Such a laser machine can record which adjustment of the positions of an optical element or of the machining head or part of the machining head leads to which adjustment of the lateral position or the focal point in the focal plane or with respect to a reference point. This assignment can be recorded and stored and the lateral position of the focal point can be set to a preset desired position inside the focal plane or with respect to a reference point on the basis of the stored assignment. As a result, it is possible to produce a less expensive laser machine, since it can be manufactured with less strict tolerances, for example with regard to the movement and guidance of the optical elements. Tolerances can be reproducibly compensated for by the setting means. In this case, the focal point can be set to the preset position by moving an additional optical element using an actuator, with no assignment of the change in the position of which optical element to a change in the focal position having been stored.

As a result of the setting means being controllable by a control device, the position can be set by means of a machine, and therefore manual setting by means of an operator is no longer required.

It is also possible to correct the position of the focal point during a machining process by setting the position of the optical elements, which setting process can be actuated and is not possible when only manual movement is provided.

The control device can also comprise a first regulator, by means of which the position of the focal point in the focal plane or with respect to a reference point can be adjusted. For this purpose, a deviation from the assignment, which is selected to adjust a specific lateral position of the laser-beam focus within the focal plane or with respect to a reference point, of positions of optical elements to positions of the focal point in the focal plane or with respect to a reference point and actual focal position in the focal plane or with respect to a reference point, which is recorded by a measurement device. Therefore, after the position of the focal point has been adjusted at first, this position can be changed, in particular if changes occur to the position as a result of thermal influences.

A second measurement device can be provided for recording the lateral position and/or shape of a laser-beam nozzle and for determining the nozzle center, and the control device can comprise a second regulator for adjusting the position of the focal point with respect to the laser-beam nozzle. Positional changes caused by changes to the laser-beam nozzle (for example the position and/or shape thereof) can therefore be taken into consideration.

The first and second regulator can be cascaded. This means that the output variable of the second regulator can influence the reference variable of the first regulator.

Advantageous developments are shown in the drawings and the claims. Additional advantages, features and details of the invention can be found in the following description, in which embodiments of the invention are described with reference to the drawings. In this case, the features mentioned in the claims and in the description can each be essential to the invention, either individually or in any combination.

DETAILED DESCRIPTION

Figure 1:
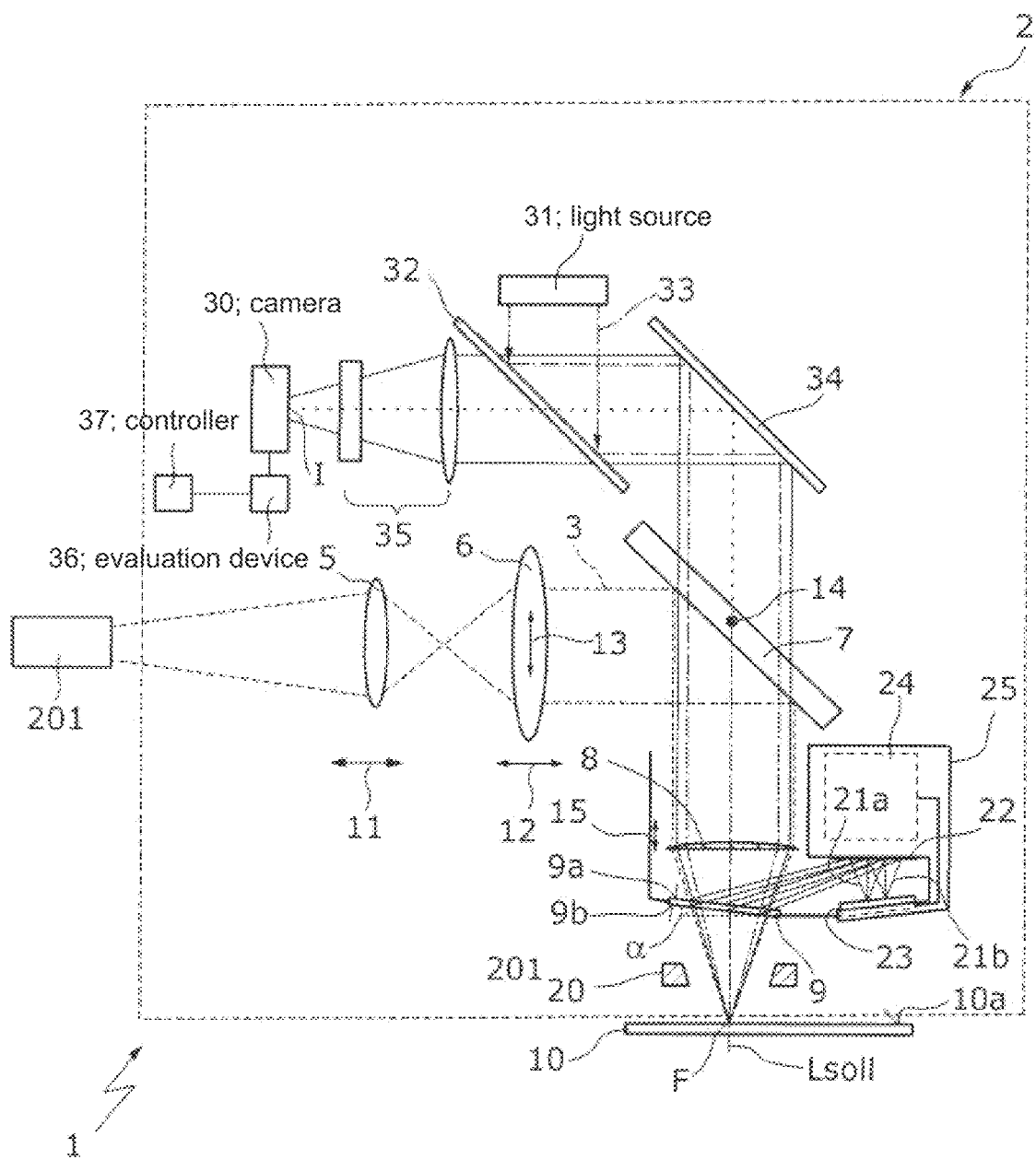
FIG. 1 is a schematic view of a laser machine.

FIG. 1 shows a laser machine 1 having a laser-beam machining head 2. A plurality of optical elements 5, 6, 7, 8, 9 are arranged in the beam path of a laser beam 3, which is guided to the laser-beam machining head 2 via an optical fiber 201. The optical elements 5 to 8 are used for beam-forming and to orient the laser beam 3 to a workpiece 10, and the optical element 9 constitutes a protective glass for protecting the rest of the optical elements from contamination. The laser beam 3 is focused on the surface 10a of the workpiece 10, and therefore, in the present embodiment, the workpiece surface 10a represents a focal plane in which the focal point F lies.

The position of the focal point F in the focal plane, i.e., on the workpiece surface 10a, is dependent on the position of one or more of the optical elements 5, 6 and 8 in the direction of the double-headed arrows 11, 12 and 15, inter alia. At least one of the optical elements 5 to 8 can be moved by a setting means (or a setting system), in particular, a drive, in order to thereby change the position of the focal point F on the workpiece surface 10a, i.e., in the focal plane, without thereby changing the position of the focal point F perpendicularly to the focal plane. For example, the optical element 6 can be moved by means of a motor perpendicularly to the beam propagation direction in the direction of the double-headed arrow 13, or the optical element 7 can be pivotable about the axis 14 by means of a motor.

Before a laser-beam machining process begins, in the example shown, the position of one or more of the optical elements 5, 6 or 8 changes in the propagation direction of the laser beam 3 (double-headed arrows 11, 12 and 15), and the effect on the (lateral) position of the focal point F in the focal plane is recorded. This assignment (or association) of the change in the position of one or more of the optical elements 5, 6 or 8 to the lateral position of the focal point F is stored. With the knowledge of this assignment, the position of the focal point F in the focal plane can then, right at the start of and during the laser-beam machining process, be adjusted to a preset position $L_{setpoint}$ in a manner controlled by the optical element 6 or 7. For example, the focal point F can be positioned in the middle of a laser-beam nozzle 20. During the laser-beam machining process, the position of the focal point F in the laser-beam nozzle 20 can also be monitored and regulated to the preset position $L_{setpoint}$. In this case, it is possible not to take the optical element 7 into consideration when recording and storing the effect of a change in the position of one or more optical elements on the lateral position of the focal point. It is also conceivable for the effect of a change in the position of the optical element 7 on the focal position to be recorded and stored. It is also conceivable for additional or alternative optical elements 5, 8 to be moved in addition to the optical elements 6 and 7 in order to adjust the focal position to the preset focal position. For example, only one of the optical elements 5-8 could also be moved in order to adjust the focal position to the preset focal position.

Several possible ways of recording the position of the focal point F are conceivable. The optical element 9 can be formed as a protective glass (e.g., thin parallel plate), which is arranged at a tilt angle α with respect to the focal plane. The optical element 9 is used to protect the optical components arranged inside of the laser-beam machining head 2 against contamination, for example smoke or splashes, which may occur when machining the workpiece 10 by means of a laser beam 3. The optical element 8 that is formed as a focusing lens is arranged in the beam path, upstream of the optical element 9, and is used to focus the laser beam 3 on the workpiece 10, more specifically on the surface 10*a* thereof. In this case, the distance between the optical element 8 and the surface 10*a* of the workpiece 10 corresponds to the focal width f of the optical element 8. A small proportion of the laser radiation is reflected on both the upper side 9*a* of the optical element 9 that faces the optical element 8 and the lower side 9*b* of the optical element 9 that faces away from the optical element 8, despite an anti-reflection coating (not shown) applied to the respective sides 9*a*, 9*b*. This laser radiation 21*a*, 21*b* that is reflected back at the optical element 9 is deflected by means of a folding mirror 22 and impinges on a spatially resolving detector 23, which is likewise inclined with respect to the focal plane by the tilt angle α (but in the opposite direction to the optical element 9).

The size of the tilt angle α is selected on the basis of the focal width f and on the distance between the optical element 9 and the optical element 8 such that the laser radiation 21*a*, 21*b* that is reflected back is coupled out of the beam path of the laser beam 3, e.g., does not impinge on the optical element 8, but can be recorded by a detector 23 arranged adjacently to the laser beam 3. Typical values for the tilt angle α are between 5° and 25°.

By means of the size or diameter of the laser radiation 21*a*, 21*b* on the detector 23, the focal position of the laser beam 3 perpendicularly to the focal plane can be determined, since the size of the impingement region is dependent on the focal position. In addition, the position of the laser-beam focus F in the focal plane can be determined from the position where the laser radiation 21*a*, 21*b* impinges on the detector 23. The laser radiation 21*a*, 21*b* that is reflected back from different sides 9*a*, 9*b* of the optical element 9 impinges on the detector 23 in different places or in different impingement regions, and therefore it is possible to assign (or associate) the laser radiation 21*a*, 21*b* detected to the respective sides 9*a*, 9*b* of the optical element 9 by means of an image evaluation device (or an image evaluator) 24, which is a component of a focus sensor 25 and is coupled to the detector 23.

For further details regarding the functionality of the focus sensor 25, reference is made to DE 10 2011 007 176 A1.

Alternatively or in addition, a camera 30 can be provided, which is operated in the reflected-light mode in the present example, e.g., an additional light source 31 is provided above the workpiece 10, which couples illumination radiation 33 into the beam path coaxially with the laser-beam axis by means of a partially reflecting mirror 32. The additional light source 31 can, for example, also be arranged outside the laser-beam machining head 2 and directed to the workpiece 10. Alternatively, the light source 31 can be arranged inside the laser-beam head 2, but not be directed to the workpiece 10 coaxially with the laser beam.

The illumination radiation 33 is directed to the workpiece 10 by means of a deflection mirror 34. Radiation reflected by the workpiece 10 are likewise deflected by means of the deflection mirror 34 and are directed to the camera 30 after being focused by means of a focusing device 35.

The camera 30 can therefore take a high-resolution image of a cut-out of the workpiece surface 10*a*. The image is delimited by the circular inner contour of the laser-beam nozzle 20. An evaluation device (or evaluator) 36 is used to evaluate the captured image and in particular to detect the position of the focal point F on the workpiece 10. In a similar manner to the focus sensor 25, the evaluation device 36 can be connected to a control device (or controller) 37, which is used to control and/or regulate the position of the focal point F in the focal plane and/or with respect to the center of the laser-beam nozzle 20, and which brings about the movement of the optical elements 6 and 7.

Figure 2:
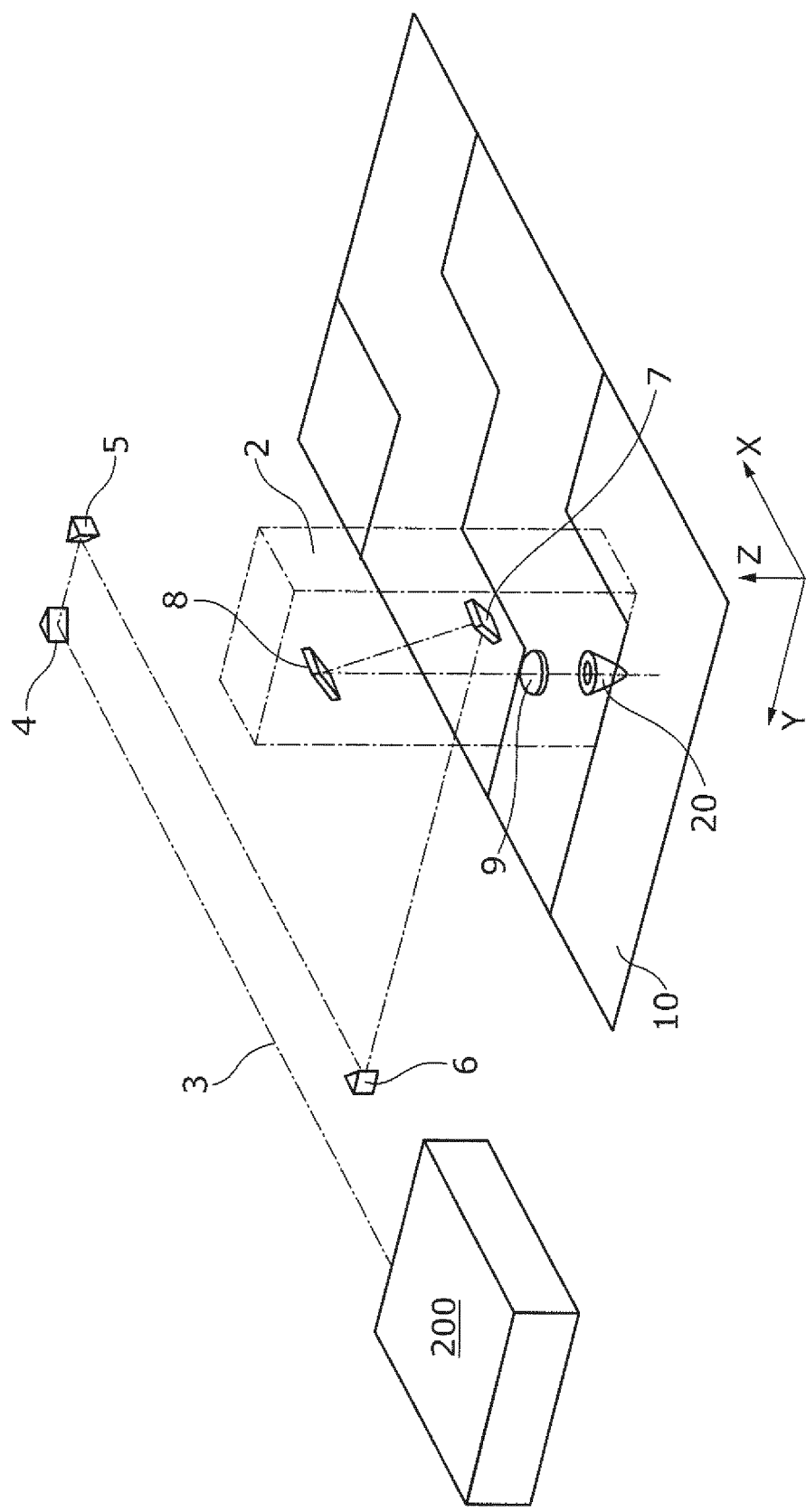
FIG. 2 is an alternative embodiment of a laser machine.

FIG. 2 shows an alternative variant of a machine 1 for laser-beam machining, where corresponding components are denoted by the same reference numerals as in FIG. 1, which includes free beam guidance of the laser beam 3 that is generated by a laser 200. The laser beam 3 is guided to the laser-beam nozzle 20 by means of different optical elements 4-9, while the laser-beam machining head 2 is moved in the work area in the x, y and z direction, at least one of the optical elements 4-9 being movable by means of an actuator, preferably at least the optical elements 7 and 9 being movable by means of an actuator. As a result of manufacturing tolerances, for example in the guidance of the laser-beam machining head 2 or the movement of the optical elements 4-9, changes in position or tilting movements of the optical elements 4-9 can occur when the laser-beam machining head 2 is placed in different positions, which lead to a change in the lateral position of the laser-beam focal point. This lateral position change can be reproduced and can be compensated for, as described in the previous paragraphs, for example by means of controlled tilting of the optical element (mirror) 8.

In another embodiment (no image therefor), the machining head of the laser machine can be made up of several parts such that optical elements are not shifted in order to change the beam diameter, for example, but the position of the nozzle in the beam propagation direction is changed by the lower part of the machining head being shifted relative to the upper part. If the axis of said nozzle guide is not parallel to the beam propagation direction, a reproducible offset is produced between the beam center and the nozzle center, which can be compensated for in a controlled manner, as described above.

Figure 3:
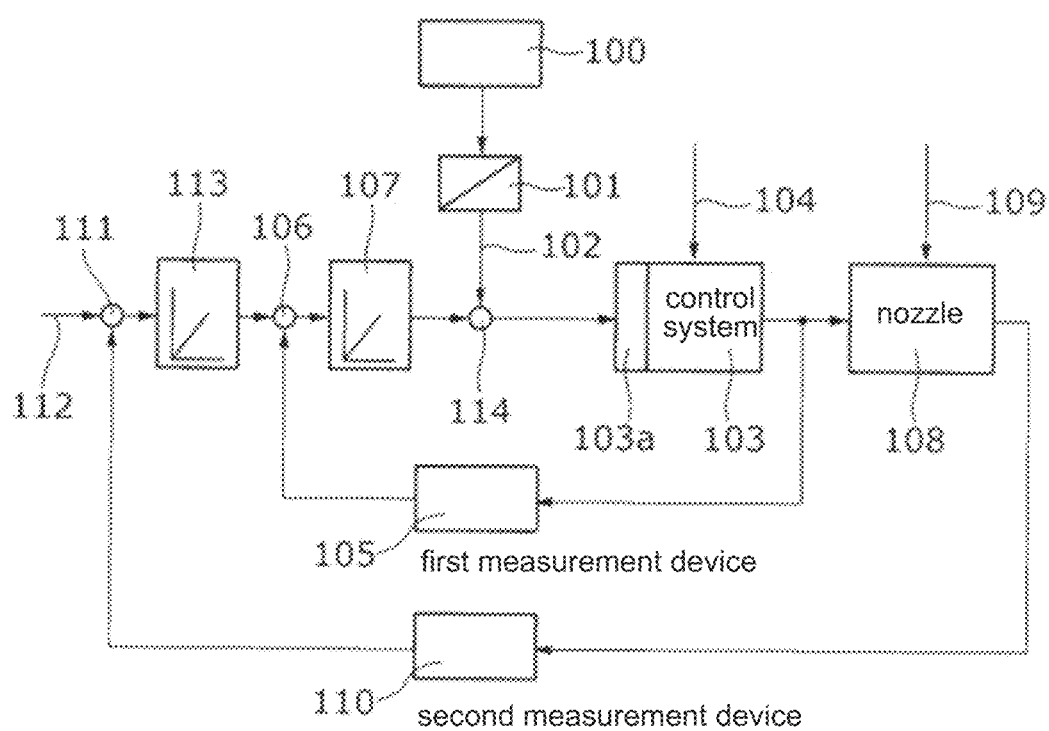
FIG. 3 is a diagram explaining a method of machining material using a laser beam.

The schematic view in FIG. 3 is used to explain a machining method. Firstly, at position 100, prior to the laser-beam machining process, for example when the laser machine is put into operation, the position of one or more of the optical elements 5, 6 or 8 in the beam propagation direction in the laser-beam machining head according to FIG. 1 or the position of the machining head 2 in the machine according to FIG. 2 (and therefore indirectly the position of the optical elements 4-9) changes, and the influence of such a change in position on the position of the focal point F in the focal plane is recorded. This influence is recorded by means of a first or second measurement device 105, 110. This assignment (or association) of changes to the position of one or more of the optical elements 4 to 9 and/or of the laser-beam machining head 2 to the position of the focal point F is stored, see position 101. For example, the assignment can be recorded in a table. A setpoint position, e.g., the preset position $L_{setpoint}$ of the focal point, and the setting of one or more of the optical elements 4 to 9 required therefor, are specified, see arrow 102. On the basis of these values, the lateral position of the focal point F is adjusted by adjusting means (or adjustor) of at least one optical element 6 or 7 according to FIG. 1 (or 6, 7 or 8 according to FIG. 2, for example) being controlled, for example. The adjusting means can also represent actuators 103a of a closed-loop control system 103. Since disturbance variables 104, such as temperature changes, can affect this adjustment, the lateral position of the focal point F is recorded during the laser-beam machining process by means of the first measurement device 105 and is passed to an addition member 106, the output of which goes to a first regulator 107.

The lateral position of the focal point F can be adjusted in particular such that it is central with respect to the laser-beam nozzle 20, which is shown by block 108. The position of the nozzle center can change due to disturbance variables 109, for example a change in the position and/or shape of the laser-beam nozzle 20. Such changes can be caused by the replacement of the laser-beam nozzle 20 or by damage to or contamination of the nozzle during the laser-beam machining process. In the example shown, a second measurement device 110 therefore records the position of the center of the laser-beam nozzle 20 and the position of the focal point F with respect to the nozzle center. The measurement result is passed to an addition member 111, for which a setpoint value 112 for the lateral position of the focal point F with respect to the laser-beam nozzle 20 or the laser-beam nozzle center is also specified. The control deviation is supplied to a second regulator 113, the output of which likewise goes to the addition member 106. The regulators 107, 113 are therefore cascaded.

The manipulated variable(s) of the regulator 107 is/are added in the addition member 114 to the position(s) of the optical elements 4 to 9 that are specified by arrow 102.

At least the regulators 107, 113 could be a component of the control device 37. Both the focus sensor 25 and the arrangement with the components 30-36 can be a first and/or second measurement device 105, 110. The elements 106, 107, 114, 103a, 103 and 105 can form an inner closed-loop control system.

What is claimed is:

1. A method performed by a laser machine, the method comprising:
   recording an influence of a change in a position of at least one movable laser machine component associated with a beam path of a laser beam on a lateral position of a focal point of the laser beam in a focal plane or relative to a reference point on a laser beam machining head of the laser machine;
   storing, based on the recorded influence, an association between the position of the at least one movable laser machine component and the lateral position of the focal point of the laser beam; then,
   setting, based on the stored association, the focal point to a preset lateral position in the focal plane or relative to the reference point by setting the position of the at least one movable laser machine component; and
   machining a material by a laser beam machining process using the set focal point,
   wherein the preset lateral position corresponds to a center of a laser beam nozzle, and wherein the focal point is positioned centrally in the laser beam nozzle during the laser beam machining process.

2. The method of claim 1, comprising:
   recording an influence of a change of at least one parameter on the change of the lateral position of the focal point in the focal plane or relative to the reference point; and
   storing an association between the at least one parameter and the lateral position of the focal point in the focal plane or relative to the reference point,
   wherein the at least one parameter comprises the position of the at least one movable laser machine component.

3. The method of claim 1, wherein the at least one movable laser machine component comprises at least one optical element in the beam path of the laser beam, and
   wherein setting the position of the at least one movable laser machine component comprises moving the at least one optical element in the beam path of the laser beam by an actuator.

4. The method of claim 1, wherein the focal point is set during the laser beam machining process.

5. The method of claim 1, wherein the preset lateral position is deliberately offset with respect to the center of the laser beam nozzle, and
   wherein the focal point is positioned deliberately eccentrically in the laser beam nozzle during the laser beam machining process.

6. The method of claim 1, further comprising:
   during the laser beam machining process, monitoring the lateral position of the focal point of the laser beam and regulating the focal point of the laser beam to the preset lateral position in the focal plane or relative to the reference point.

7. The method of claim 6, wherein regulating the focal point of the laser beam comprises:
   using the monitored lateral position of the focal point in a closed-loop control system to adjust the lateral position of the focal point to the preset lateral position by superposing an adjusted movement of the at least one movable laser machine component on the set position of the at least one movable laser machine component.

8. The method of claim 1, further comprising:
   recording at least one of a lateral position or a shape of the laser beam nozzle; and
   specifying one of the center of the laser beam nozzle and a position having a deliberate offset with respect to the center of the laser beam nozzle as the preset lateral position.

9. The method of claim 1, wherein the at least one movable laser machine component comprises at least one of:
   at least one optical element in a beam path of the laser beam,
   the laser beam machining head in a work area of the laser machine, or
   a movable part of the laser beam machining head.

10. The method of claim 1, wherein the reference point on the laser beam machining head comprises the center of the laser beam nozzle.

11. A laser machine comprising:
- a laser beam machining head;
- a laser beam nozzle;
- a first measurement device configured to record a lateral position of a focal point of a laser beam in a focal plane or relative to a reference point on the laser beam machining head;
- a non-transitory storage medium configured to store an association between a position of at least one movable laser machine component associated with a beam path of the laser beam and the lateral position of the focal point of the laser beam in the focal plane or relative to the reference point; and
- a setting system configured to be controlled by a controller to set the position of the at least one movable laser machine component based on the stored association, such that the focal point of the laser beam is set to a preset position in the focal plane or relative to the reference point,
- wherein the controller comprises a first regulator configured to regulate the lateral position of the focal point in the focal plane or relative to the reference point.

12. The laser machine of claim 11, further comprising: a second measurement device configured to record at least one of a lateral position or a shape of the laser beam nozzle, wherein the controller comprises: a second regulator configured to regulate the lateral position of the focal point with respect to the laser beam nozzle.

13. The laser machine of claim 12, wherein the first regulator and the second regulator are cascaded.

14. The laser machine of claim 13, wherein an output variable of the second regulator is capable of influencing a reference variable of the first regulator.

15. The laser machine of claim 11, wherein the at least one movable laser machine component comprises at least one of:
- at least one movable optical element in the beam path of the laser beam,
- the laser beam machining head in a work area of the laser machine, or
- a movable part of the laser beam machining head.

16. The laser machine of claim 11, wherein the reference point on the laser beam machining head comprises a center of the laser beam nozzle.

17. The laser machine of claim 11, wherein the first measurement device comprises at least one of:
- a focal position sensor arranged on the laser beam machining head or
- a camera arranged on the laser beam machining head.

* * * * *